Patented May 30, 1933

1,912,275

UNITED STATES PATENT OFFICE

HANS OTTO HERTLEIN, OF COLOGNE-WORRINGEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF ACETYLATING CELLULOSE

No Drawing. Application filed November 23, 1928, Serial No. 321,516, and in Germany December 2, 1927.

The present invention relates to the manufacture of acetone soluble cellulose acetates.

The principal catalysts used in the acetylation of cellulose are, as is well known, free sulfuric acid and zinc chloride. Sulfuric acid has the disadvantage that while the time required for the reaction is shortened, it readily yields valueless products, while when zinc chloride is used the reaction lasts a very long time.

Mixtures of catalysts have also been proposed, such as zinc chloride + phosphorus pentachloride, zinc sulfate + phosphorus oxychloride, for formyl cellulose also zinc chloride + sulfuryl chloride and the like. The use of zinc chloride + free sulfuric acid alone has so far yielded no valuable products, since the solution of the acetyl celluloses thus obtained is so turbid as to be useless for almost all applications.

In accordance with the present invention this disadvantage is removed by adding to an acetylation mixture, containing zinc chloride and sulfuric acid as catalysts, said mixture being useless by itself, small quantities of hydrochloric acid, in a quantity that the quality of the acetyl cellulose is not injured; generally an amount of about 0.2 to about 1% hydrochloric acid calculated on the amount of the cellulose to be acetylated is sufficient, the best results being obtained by adding about 0.5% of hydrochloric acid.

Instead of hydrochloric acid substances yielding hydrochloric acid, for example, acetyl chloride and tetrachloroethane, may be used, last substances being equivalents of hydrochloric acid. This manner of acetylation not only yields a final product of high value giving clear solutions, but also enables a shortening of the time of reaction to an extent not hitherto possible.

The invention is illustrated by the following example:

*Example:*—100 parts by weight of cellulose are added to a mixture of 800 parts by weight of glacial acetic acid, 350 parts by weight of acetic anhydride, 6 parts by weight of zinc chloride and 4 parts by weight of sulfuric acid. To this mixture 0.5 part by weight of hydrochloric acid (1.19) is added. The acetylation is complete in 1–2 hours. Hydrolysis is effected, if necessary, according to the known methods.

I claim:

1. A process which comprises acetylating cellulose in the presence of zinc chloride and sulfuric acid as catalysts with the addition of hydrochloric acid.

2. A process which comprises acetylating cellulose in the presence of zinc chloride and sulfuric acid as catalysts with the addition of about 0.2 to about 1% hydrochloric acid calculated on the amount of the cellulose to be acetylated.

3. A process which comprises acetylating cellulose in the presence of zinc chloride and sulfuric acid as catalysts with the addition of about 0.5% hydrochloric acid calculated on the amount of the cellulose to be acetylated.

4. A process which comprises acetylating 100 parts by weight of cellulose with a mixture of 800 parts by weight of glacial acetic acid, 350 parts by weight of acetic anhydride, 6 parts by weight of zinc chloride, 4 parts by weight of sulfuric acid and 0.5 part by weight of hydrochloric acid.

In testimony whereof I have hereunto set my hand.

HANS OTTO HERTLEIN. [L. S.]